United States Patent
Koga et al.

(10) Patent No.: US 7,855,946 B2
(45) Date of Patent: Dec. 21, 2010

(54) RECORDING AND REPRODUCING APPARATUS PROVIDED WITH PROBE MEMORY

(75) Inventors: Akihiro Koga, Tokyo (JP); Masahiro Kuwata, Kawasaki (JP); Kei Masunishi, Kawasaki (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 363 days.

(21) Appl. No.: 12/051,094

(22) Filed: Mar. 19, 2008

(65) Prior Publication Data
US 2008/0239931 A1   Oct. 2, 2008

(30) Foreign Application Priority Data
Mar. 27, 2007   (JP)   ............................ 2007-082698

(51) Int. Cl.
*G11B 7/00* (2006.01)
(52) U.S. Cl. .................................... 369/126
(58) Field of Classification Search ................ 369/126, 369/44.14, 44.15
See application file for complete search history.

(56) References Cited

U.S. PATENT DOCUMENTS 7,447,140 B2 * 11/2008 Lutwyche et al. .......... 369/126
7,502,304 B2 * 3/2009 Maeda et al. ............... 369/126
2008/0068743 A1   3/2008 Kubo et al.
2008/0089211 A1 * 4/2008 Chu et al. .................. 369/126
2008/0253269 A1   10/2008 Koga et al.

FOREIGN PATENT DOCUMENTS

| JP | 04-258826 | 9/1992 |
|----|-----------|--------|
| JP | 05-126518 | 5/1993 |
| JP | 06-111333 | 4/1994 |
| JP | 07-262539 | 10/1995 |
| JP | 09-026427 | 1/1997 |
| JP | 2003-308651 | 10/2003 |
| JP | 2007-080441 | 3/2007 |
| WO | 2005/020226 A1 | 3/2005 |
| WO | 2007-013507 A1 | 2/2007 |

OTHER PUBLICATIONS

Japanese Office Action dated Apr. 7, 2009 corresponding to U.S. Appl. No. 12/051,094, filed Mar. 19, 2008.

* cited by examiner

*Primary Examiner*—Nabil Z Hindi
(74) *Attorney, Agent, or Firm*—Turocy & Watson, LLP

(57) ABSTRACT

A recording and reproducing apparatus supports a recording medium swingably in at least two axis directions by a support section formed in a shape having elasticity. When an access can be made to a memory, the recording medium is constantly and reciprocatingly moved in a direction along data row. Thus, a positional relationship with a probe head is always grasped. When an access is made, a moving time associated with position identification is reduced, and precise and fast movement is achieved.

9 Claims, 5 Drawing Sheets

US 7,855,946 B2

RECORDING AND REPRODUCING APPARATUS PROVIDED WITH PROBE MEMORY

CROSS-REFERENCE TO RELATED APPLICATIONS

This application is based upon and claims the benefit of priority from prior Japanese Patent Application No. 2007-082698, filed Mar. 27, 2007, the entire contents of which are incorporated herein by reference.

BACKGROUND OF THE INVENTION

1. Field of the Invention

The present invention relates to a recording and reproducing apparatus provided with a probe memory having a positioning mechanism to be mounted on a recording and reproducing head using a plurality of probe heads.

2. Description of the Related Art

In a general HDD (Hard Disk Drive) system, a disk-shaped recording/readout disk is rotated at a high speed by means of equipment such as a spindle motor. A rotatable arm is disposed in the vicinity of this reading/readout medium. At a tip end part of the arm, a probe head section is provided for carrying out recording/readout relative to a recording face of the recording and reproducing disk.

Specific patterns going from the center of the disk to the periphery thereof are recorded in this recording/readout disk. These specific patterns are feedback information (servo patterns) for positioning of the probe head section. The probe head section swings the arm by means of equipment such as a voice coil motor, based on the positional information obtained from the feedback information, and is moved to a specified recording/readout position.

In addition, a probe memory device is known as a device having a different storage mechanism. For example, in Japanese Patent No. 3105987, there is proposed an information recording and reproducing apparatus including: a smooth recording medium fixed to an XY direction coarse movement mechanism; and one probe head disposed in opposite to a recording face of the recording medium and fixed to an XY direction fine movement mechanism, the medium and the probe head moving in a two-dimensional direction to carry out data recording/readout.

In this probe memory device, in the case where a recording capacity is increased or a recording/readout speed is increased, a movable range or a moving speed is limited in one probe head. Thus, it is considered to employ a number of probe heads to meet the demand.

In the case where a number of probe heads are disposed in a matrix manner, for example, a plurality of probe heads made up of probe head columns must face at the same time or continuously to a plurality of portions (extremely small recording areas) to be recorded/read out, and thus, high positioning precision relative to an XY direction is required.

With respect to this positioning, for example, in JP-A 9-26427 (KOKAI), a positioning apparatus is proposed for carrying out relative position control between a probe head and a stage. This positioning apparatus is provided at a scaling section formed in the shape of saw-tooth having constant pitches all around a recording area (recording face) of a square-shaped recording medium fixed on a stage, and a position detecting probe head is made proximal thereto. The position detecting probe head is fixed to a probe side substrate that moves in an XY direction by means of a laminate type piezoelectric actuator. This positioning apparatus detects a displacement by means of probe heads that are proximal to four scaling sections.

As in the positioning apparatus disclosed in JP-A 9-26427 (KOKAI) described previously, a mechanism in which a recording medium is supported by an elastic member is proposed as a mechanism that relatively moves between a recording medium and a probe array. A support mechanism supported by this elastic member is divided into two sections, i.e., a first configuration in which an elastic beam is disposed in a placement face of the recording medium and a second configuration in which an elastic beam is disposed in a thickness direction of the recording medium.

In order to respond to a requirement for further downsizing or increasing a storage capacity, the recording density of a recording medium is made high. Thus, a positioning mechanism for carrying out precise positioning of a probe array or decreasing a dead space is required.

BRIEF SUMMARY OF THE INVENTION

An embodiment of the present invention provides a recording and reproducing apparatus, comprising: a recording medium including record information and servo information; a probe array disposed in opposite to the recording medium, including a plurality of probe heads for recording/reading out the record information and a servo head acquiring the servo information, the probe heads and the servo head are disposed in a matrix manner; an actuator generating a change in a relative position between the probe array and the recording medium; a position sensor which measures a change in an absolute position of the recording medium; and a control section which drives and controls the actuator, during an operable state in which the recording medium is accessible for recording/reading out, generates positional information between the recording medium and the probe array, from the change in the absolute position and the servo information.

DETAILED DESCRIPTION OF THE INVENTION

Hereinafter, embodiments of the present invention will be described in detail with reference to the accompanying drawings.

Figure 1:
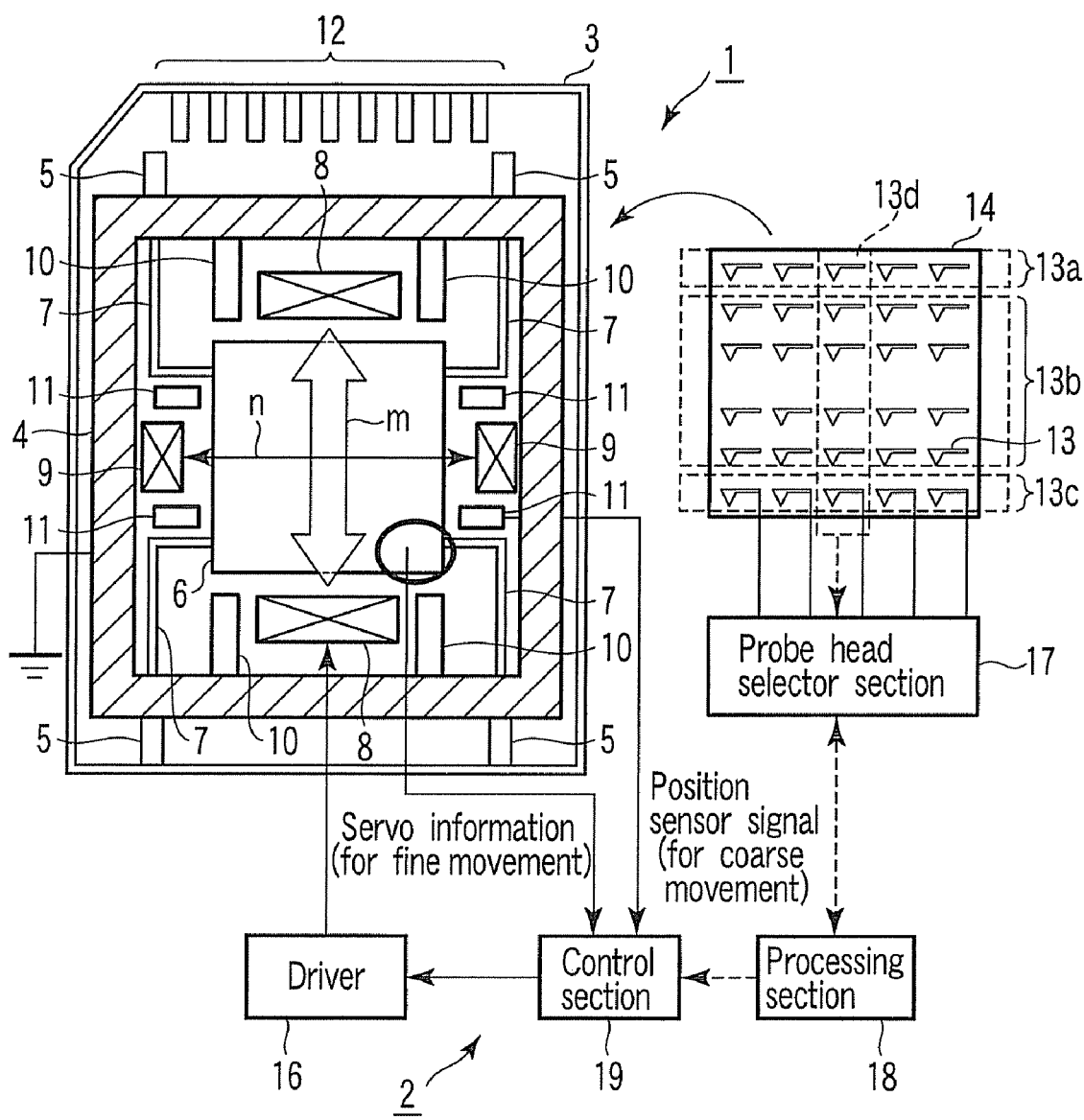
FIG. 1 is a view showing an exemplary configuration of a recording and reproducing apparatus according to a first embodiment.

FIG. 1 shows an exemplary configuration of a recording and recording apparatus according to the first embodiment of the present invention. The directions of driving a recording medium in the first to third embodiments described below include two-axis directions (for example, X and Y directions) that are orthogonal to each other. A first axis direction (data row direction or Y direction) is a direction of always reciprocatingly driving the recording medium, and is referred to as a drive axis "m" (or drive axis direction). The other second axis direction (track direction or X direction) is a direction for a probe head to read data, and is referred to as a control axis "n" (or control axis direction). In addition, a planar direction formed by the drive axis "m" and the control axis "n" is referred to as a recording face direction.

The recording and reproducing apparatus of the present embodiment roughly includes: a probe memory device 1 for recording information; and a device main body 2 for carrying out information processing including information recording/readout relative to the probe memory device 1 and driving and controlling a positioning mechanism of a probe head described later.

The probe memory device 1 includes: a frame member 4 made of a conductor and fixed to a base section (housing or circuit board) 3 while a vibration proof member 5 is interposed therebetween; a rectangular recording medium 6 for recording information; a support section 7 for connecting both ends of two edges in the drive axis direction of the recording medium 6 and the frame member 4 at four portions, and elastically supporting them in the recording face direction; a drive axis actuator 8 for continuously and reciprocatingly moving the recording medium 6 in the drive axis direction (a direction along the data row); a control axis actuator 9 for reciprocatingly moving the recording medium 6 in the control axis direction (data row direction); stopper sections 10 provided at four portions inside of the frame member 4 at both sides of the drive axis actuator 8, and limiting the reciprocating operation range of the recording medium 6 in the drive axis direction "m"; a plurality of position sensors 11 provided at four portions at both sides of the control axis actuator 9, for detecting the position of the recording medium 6; and a probe array section 14 that is opposed to a plurality of stopper sections 10 limiting the reciprocating operation range and the recording medium 6 at predetermined intervals and that is fixed to the frame member 4 by means of a support member (not shown).

Further, in the probe memory device 1, a connector electrode 12 having a plurality of terminals is provided at one edge of the base section (housing) 3. The terminals of the connector electrode 12 are connected to the respective constituent members through internal wiring (not shown), and are used for exchange of data and control signals at the time of recording/readout or for supply of driving power. The frame member 4 is grounded, and at a GND potential. Specifically, the frame member 4 is electrically connected to an earth of the device main body through the connector electrode.

In the present embodiment, the frame member 4, the recording medium 6, and the support section 7 can be formed integrally or separately with the use of a semiconductor manufacturing technique using a silicon wafer, for example. At this time, all of them may be formed on one wafer, or alternatively, may be assembled after being separately formed with the use of a plurality of wafers. Of course, the frame member 4, the recording medium 6, and the support section 7 can be formed in a structure in which they are arranged on one flat face or in a laminated structure. The drive axis actuator 8 and the control axis actuator 9 can be assembled with the frame member 4, the recording medium 6, and the support section 7 with the use of an MEMS manufacturing technique.

In addition, at the probe array section 14, a plurality of probe heads 13 are disposed in a matrix shape. The probe heads 13 are formed in the shape of a cantilever system, for example. By means of vertical movement of a tip end portion of the cantilever, information recording/readout is carried out with respect to the recording medium 6. Among these arrangements, as shown in FIG. 1, probe head groups 13a and 13c are used to generate servo information, and a probe head group 13b is used separately for the purpose of recording/reading out information such as data. In the present embodiment, servo information is continuously sampled from one or more probe head rows (drive axis direction) 13d disposed at a substantial center, and the sampled servo information is used as fine movement position information. It may be thought that probe heads of the probe head groups 13a and 13c are used as servo heads separately from probe heads for carrying out data recording/readout. As a separation example, probe heads responsible for data are divided into a plurality of groups, so that these groups each include at least one servo head. These groups are collected in plurality to be a unit, and are allocated to the recording medium in units.

The device main body 2 includes: a driver 16 for vibrating (vertically moving) the probe head 13 and driving the drive axis actuator 8 and the control axis actuator 9; a probe head selector section 17 for selecting a desired probe head from the probe array section 14, and sampling a signal; a processing section 18 for generating information recorded from a detection signal of the probe head 13 or generating a signal to be recorded from information; and a control section 19 for driving and controlling the driver 16, based on a detection signal (coarse movement) of the position sensor 11 and fine movement position information contained in the probe head row 13d. The processing section 18 generates fine movement position information from servo information of the probe head row 13d which has been sampled by selection of the probe head selector section 17.

While, in the present embodiment, the recording medium 6 is elastically supported at the frame member 4, and is driven by means of the drive axis and control axis actuators 8 and 9, the probe array section 14 may be reciprocatingly moved while the recording medium 6 is fixed because it is an object of the invention to produce relative motion between the recording medium 6 and the probe array section 14.

The positioning mechanism in the present embodiment is provided with: a plurality of positioning probe heads (servo heads) provided in at least the probe array section; a drive axis actuator for reciprocatingly driving the recording medium in the driving direction; a control axis actuator for reciprocatingly driving the recording medium in the control axis driving direction; a position sensor for measuring a current position of the recording medium; the frame member 4 and the support section 7 for specifying the driving axis direction and the control axis direction for the recording medium 6; the driver 16; and the control section 19.

Figure 2:
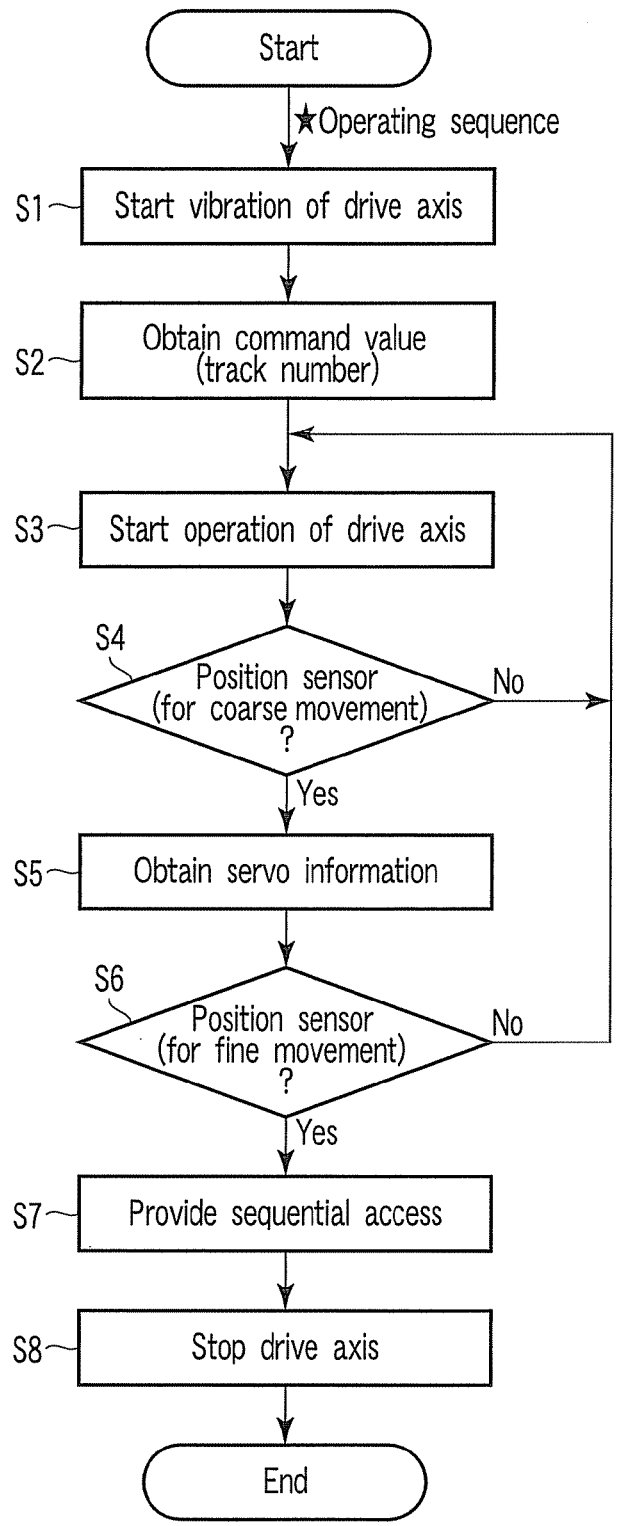
FIG. 2 is a flow chart for explaining a positioning operation in the first embodiment.

Next, a specific positioning operation of the first embodiment will be described with reference to the flow chart shown in FIG. 2.

First, when a power switch (not shown) of the device main body is turned ON, power is supplied to the respective constituent elements, and the constituent elements are started up. The drive axis actuator 8 is driven by means of the driver 16, and the recording medium 6 starts a reciprocating operation that is continuous in the drive axis direction (step S1). At this time, the position of the recording medium 6 is verified and initialized by means of a detection signal of the position sensor 11. In this initialization, the recoding medium is temporarily moved to its predetermined initial position based on the position detected by means of the position sensor 11, and then, the current operation moves to a regular reciprocating operation. The amplitude and speed of the recording medium 6 are measured, and it is verified that the measured values are obtained as set values. At this time, in the case where the reciprocating operation of the recording medium 6 does not give the set values, it is notified as an error. When the recording medium 6 has moved reciprocatingly, in the case where the recording medium 6 collides with the stopper section 10 due to an externally applied shock or for any reason, emergency stoppage occurs. Then, reciprocating operation is restarted after the medium has been temporarily restored to its initial position. If reciprocating operation cannot be carried out again, a stop state is maintained while an error is notified.

Next, the control section 19 generates command information (such as track information) for moving (vibrating) the probe array section 14 with respect to the track position for recording information or reading out the recorded information, and then, transmits the generated information to the driver 16 (step S2).

Upon receipt of the command value, in order to move the recording medium 6 in the control axis direction, the driver 16 generates drive information required to drive the control axis actuator 9. The driver 16 supplies a proper voltage/current to the control axis actuator 9, based on the drive information. By means of this supply, the recording medium 6 starts moving in the control axis direction (step S3).

First, the position sensor 11 checks whether or not the probe head 13 exists at a specified track position, and then, carries out positioning of coarse movement (step S4). After it is successfully verified that the probe head has reached the track position specified by a detection signal of the position sensor 11, the current routine proceeds to positioning of fine movement.

Next, the probe heads of the probe head groups 13a and 13c read servo information written in the recording medium 6, and the read information is reproduced (step S5). Precise positioning in the track is then carried out.

In positioning of fine movement, after verifying a track position, the probe heads 13 of the probe head groups 13a and 13c acquire positioning servo information. If the position at which the servo information has been acquired is a specified position, the reciprocating operation in the drive axis direction is stopped. Then, information recording/readout is carried out. At the time of reading out information from the recording medium 6, when information is generated as a readout error, a parity bit is provided in a recording and reproducing bit as error handling. At the time of rereading, the system seeks the tracks adjacent to the track at the time of writing.

This positioning servo information is not written in all areas of the medium, but is written only in a specific area. In the present embodiment, positioning servo information is recorded at both ends of the direction in which tracks of the recording medium 6 extend (drive axis direction). At the probe array section as well, the probe head for reading the positioning servo information is specified.

In regular reciprocating operation of the recording medium in the present embodiment, while the recording and reproducing apparatus operates, in other words, when an access can be made to the recording medium 6, the recording medium 6 continuously carries out reciprocating operation without stoppage, constantly acquires servo information for a position sensor and positioning, and grasps a current position. Therefore, when an access is made to the recording medium, the probe head can be moved immediately from the current position to the specified position.

Fast recording/readout is achieved as a whole because the moving time associated with position identification is reduced, although the actual recording time and readout (reproducing) time for the recording medium are not changed yet. In other words, from the user's standpoint, a time from instruction to execution is reduced, good response is felt, and fast processing can be realized.

Next, a modified example of the first embodiment will be described.

While the foregoing first embodiment describes an integral configuration in which the probe memory device 1 is incorporated in the recording and reproducing apparatus, the probe memory device 1 may be a constituent element that is removable from the device main body. Slots are provided at the device main body, and terminals are provided for making electrical connection to the connector electrode 12 of the inserted probe memory device 1. Through these terminals, the exchange of an information signal, power or the like is carried out. Therefore, the probe memory device 1 can be hand-held, its application is extended if a general-purpose personal computer is available as a recording and reproducing apparatus, and the memory device is available in the same manner as a portable type memory device such as USB.

Next, a recording and reproducing apparatus according to a second embodiment will be described.

In the first embodiment described previously, the recording medium 6 is reciprocatingly driven, respectively, in the two-axis directions, i.e., in the drive axis direction and the control axis direction, and then, position identification of the recording/readout positions is carried out with high precision.

Figure 3:
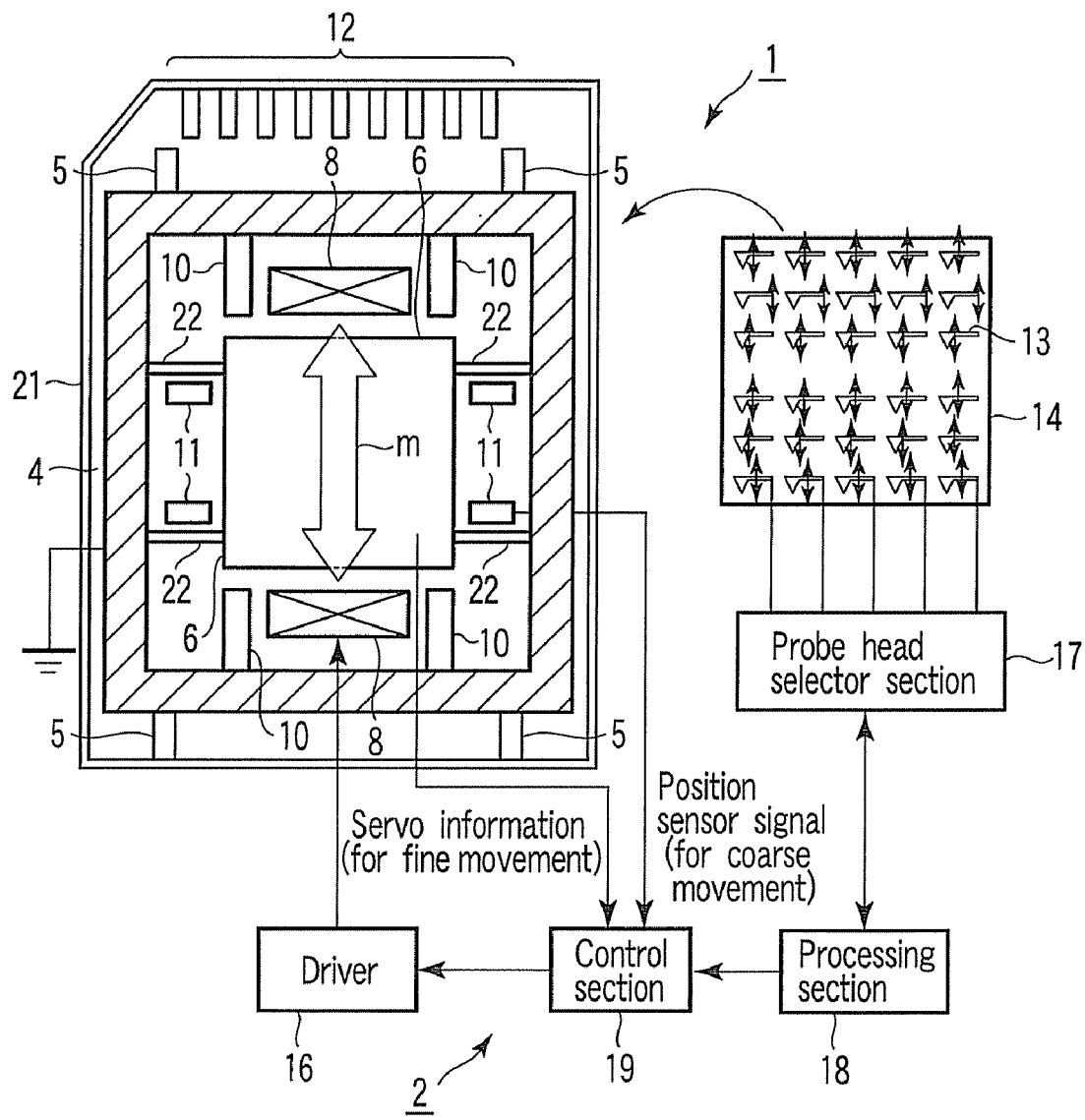
FIG. 3 is a view showing an exemplary configuration of a recording and reproducing apparatus according to a second embodiment.

The configuration of the present embodiment shown in FIG. 3 is substantially identical to that of the first embodiment described previously. The same constituent elements are designated by the same reference numerals. A duplicate description is omitted here. In the present embodiment, a vibration drive section such as an actuator is provided for vibrating the probe array section in the control axis direction.

When the recording and reproducing apparatus is operating or is in a state accessible to the recording medium, the recording medium 6 is always reciprocatingly driven in the drive axis direction. At the same time, the probe array section 14 is also vibrated in the control axis direction, and all of the probe heads 13 are integrally vibrated in a direction orthogonal to the drive axis direction (control axis direction).

The recording medium 6 is fixed to the frame member 4 at four portions to two opposing edges in a direction orthogonal to the drive axis direction (control axis direction) with the use of two support sections 22, respectively. These support sections 22 are formed in the shape of a straight bar, and swingably support the recording medium 6 in the drive axis direction.

With such a configuration, an access can be made to an arbitrary position of the recording medium 6 within a short period of time and precisely by combining regular displacement (reciprocating operation) of the recording medium 6 and vibrating operation ($\phi$ axis) of the probe head tip end with each other. In vibration of the probe head 13 in the present embodiment, while the probe array section 14 is vibrated, all of the probe heads 13 may be integrally vibrated. Alternatively, while a coil such as a solenoid coil is provided at individual probe heads 13 for imparting vibration with the use of vibration means, for example, an electric field, only the probe heads 13 selected in the probe selector section 17 may vibrate. The probe heads 13 to be selected, for example, are specific probe heads or the like for reading the positioning servo information described previously. Further, the probe head 13 may be vibrated with the use of mechanical resonance, and drive energy can be more efficiently used by way of utilizing resonance.

Next, a recording and reproducing apparatus according to a third embodiment will be described.

Figure 4:
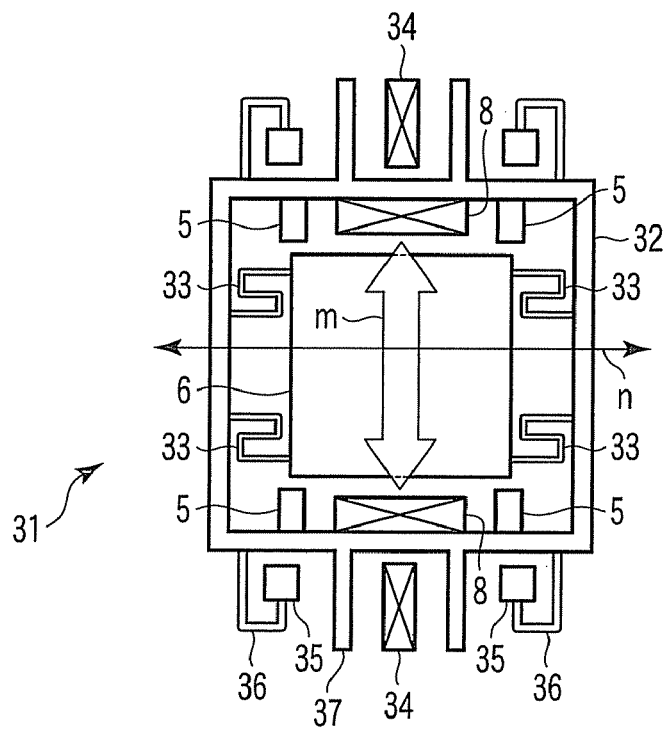
FIG. 4 is a view showing an exemplary configuration of a probe memory device according to a third embodiment.

FIG. 4 is a view showing an exemplary configuration of a probe memory device according to the present embodiment. In the present embodiment, the main body of the recording and reproducing apparatus is constructed in the same manner as in the first embodiment described previously. The groove of elastic support of the recording medium in the probe memory device is structured to avoid the generation of influence of axial interference between two axes orthogonal to each other. With respect to the constituent elements of the present embodiment, the same constituent elements in the first embodiment are designated by the same reference numerals. A duplicate description is omitted here.

A probe memory device 31 of the present embodiment reciprocatingly drives the recording medium 6 opposite to the probe array section 14 in the driving direction of at least two axes (drive axis and control axis) orthogonal to each other. The recording medium 6 is fixed to a movable frame member 32 by means of a first support member 36 formed in a U shape, the first support member elastically supporting the medium swingably in a one-axis direction (drive axis direction). This movable frame member 32 is fixed to a housing (base) 32 by means of a first support member 33 formed in an S shape, the first support member elastically supporting the medium swingably in the control axis direction. A so-called piggyback structure (stacked multi structure) is provided. In the present embodiment as well, the recording medium 6 always carries out reciprocating operation in the drive axis direction by means of the drive axis actuator 8. In positioning operation, the present embodiment is identical to the first embodiment described previously.

A configuration of the probe memory device 31 will be described in detail.

The rectangular recording medium 6 is connected to one end of the support member 33 of the S-shaped beam structure having elasticity at four portions at both ends of two edges opposite to each other in the control axis direction "n". In addition, the other end of the support member 33 is connected into a rectangular movable frame member 32 having sufficient rigidity. By means of such a support member 32, the recording medium 6 can be swung in the drive axis direction "m".

The movable frame member 32 is connected to one end of the support member 36 of U-shaped beam structure having elasticity at four portions at both ends of two edges opposite to each other in the drive axis direction "m". In addition, the other end of the support member 36 is fixed to a base section (housing) with the use of an anchor section 35. By means of such a support member 36, the movable frame member 32 can be swung in the control axis direction "n". The recording medium 6, the support members 33, 36, the movable frame member 32, and the anchor section 35, for example, can be integrally formed with the use of a semiconductor technique or a MEMS technique with respect to a silicon wafer. Of course, with respect to thickness as well, desired thickness can be easily formed at the respective portions. In addition, the probe array section can also be formed with the use a similar technique.

In the thus constructed probe memory device 31, in the case where the recording medium 6 is reciprocatingly driven in the drive axis direction, the support member 33 acts to swing in the drive axis direction, and the support member 36 acts to inhibit swinging in the drive axis direction. In contrast, in the case where the recording medium 6 is reciprocatingly driven in the control axis direction, the support member 36 acts to swing in the drive axis direction, and the support member 33 acts to inhibit swinging in the control axis direction.

Therefore, according to the present embodiment, the probe memory device 31 can avoid influence of axial interference that occurs between two axes orthogonal to each other. Further, space reduction can be achieved.

Further, a support member for supporting two drive axes is fabricated on a different silicon wafer, and is disposed in the thickness direction, thereby making it possible to decrease a dead space serving as a required installation area. In addition, the present embodiment can attain an advantageous effect similar to those of the first and second embodiments described previously.

Figure 5:
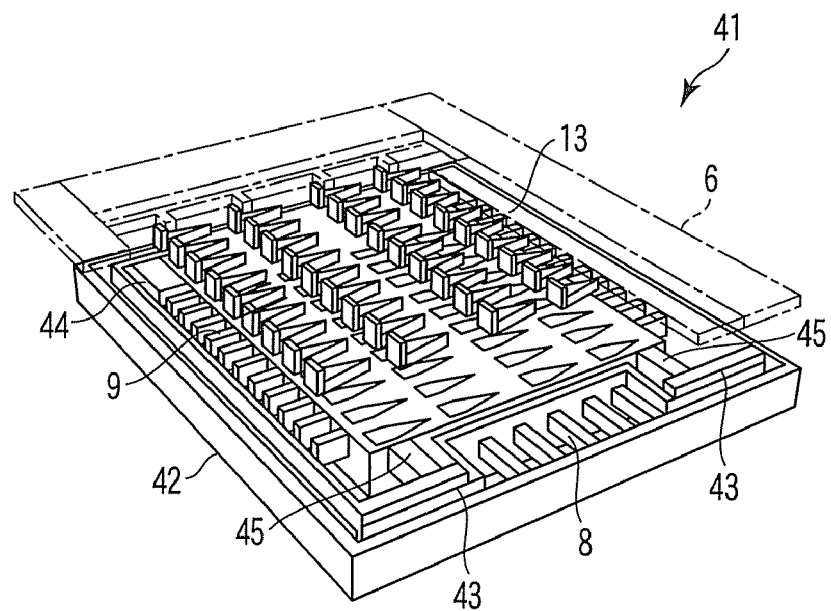
FIG. 5 is a perspective view showing an external configuration when a modified example of the probe memory device according to the third embodiment is viewed in an oblique direction.

FIG. 5 is a perspective view showing an external configuration when a modified example of the probe memory device according to the third embodiment is viewed in an oblique direction.

The probe memory device 41 of this modified example includes: an outside fixing frame member (or base section) 42; a movable frame member 44 swingably supported in the drive axis direction "m" by means of a plurality of support members 33 inside of the frame member 42; and a rectangular recording medium 14 swingably supported in the control axis direction "n" by means of a plurality of support members 35 inside of the frame member 44. In addition, the drive axis actuators 8 are disposed, respectively, at the edge sides opposite to each other in the drive axis direction "m" of the recording medium 6, and the control axis actuators 9 are disposed, respectively, at the edge sides opposite to each other in the control axis direction "n". With such a configuration, advantageous effect similar to that of the first embodiment described previously can be attained.

Next, a recording and reproducing apparatus according to a fourth embodiment will be described.

Figure 6:
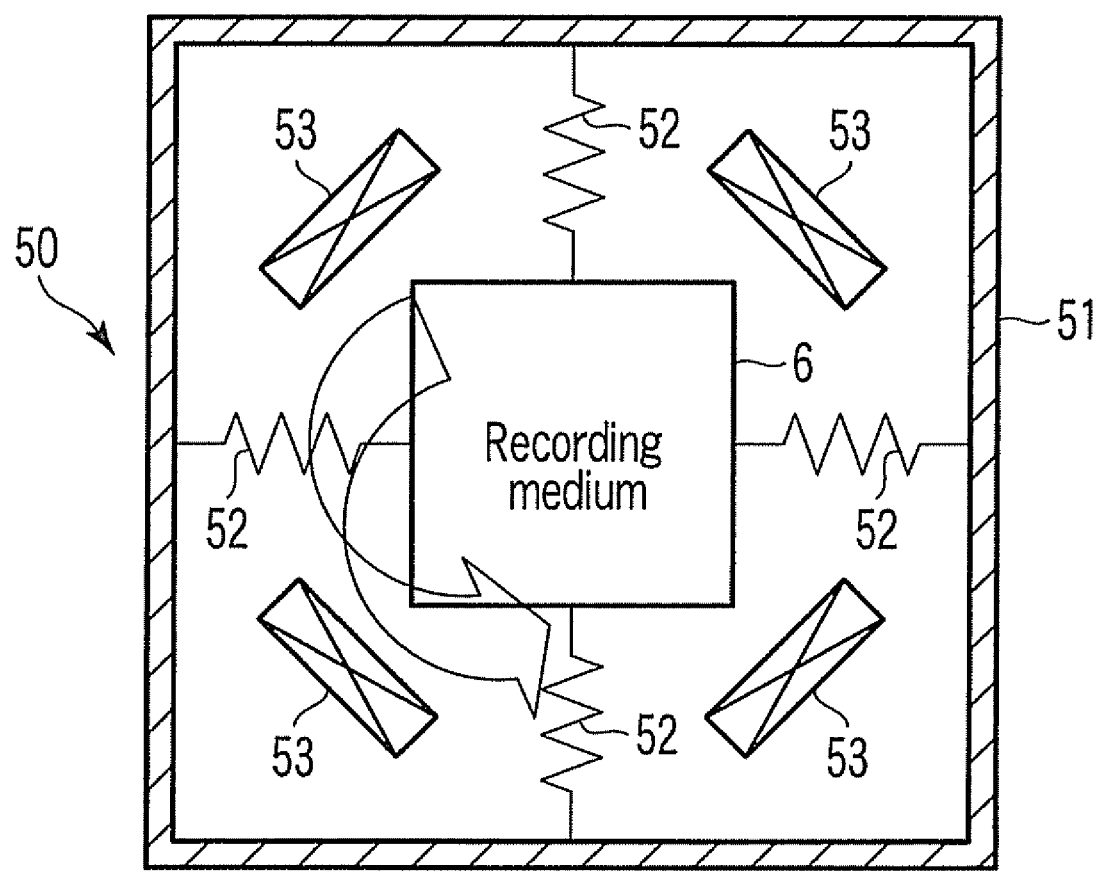
FIG. 6 is a view showing an exemplary configuration of a probe memory device of a recording and reproducing apparatus according to a fourth embodiment.

FIG. 6 shows an exemplary configuration of a probe memory device according to the present embodiment. The device main body of the recording and reproducing apparatus according to the present embodiment is constructed in the same manner as that in the first embodiment. Here, the probe memory device will be described.

This probe memory device 40 is constructed using a precession motion, instead of motions (X reciprocating movement and Y reciprocating movement) orthogonal to each other in plane, as a relative motion between the recording medium 6 and a probe array section (not shown) disposed in opposite thereto.

As shown in FIG. 6, one end of an elastic member 52 is connected to each middle point of four edges of the rectangular recording medium 6, and the other end thereof is connected to the inside of a frame member 51. The frame member 51 is fixed to a base section (refer to FIG. 1), although not shown. Four actuators 53 (53a, 53b, 53c, 53d) are provided in the vicinity of corners of the recording medium 6 on a diagonal line of the frame member 51. In this example, the actuators 53 are disposed, respectively, in orientation orthogonal to the diagonal line.

The probe memory device 50 is sequentially driven with respect to the four actuators 43. For example, this memory device is driven by changing the actuator 53a to the actuator 53b, and then, changing the actuator 53c to the actuator 53d in sequential order. By means of such drive, although the corner portions of the recording medium 6 are attracted by the actuator every time, movement is limited by means of the elastic member 52, and a precession motion is achieved. The speed of the precession motion of the recording medium 6 can be controlled with a speed of actuator switching.

According to the present embodiment, there is provided a positioning mechanism that is capable of changing the size (rotational diameter) of the precession motion in the recording medium 6 by means of the strength of driving the actuator (force of attracting the recording medium 6); with respect to control of coarse movement and fine movement, that is capable of facilitating actuator movement control in comparison with the vertical and horizontal movements (drive axis and control axis) described previously; and that is capable of achieving high precision and a small dead space.

According to the embodiments of the present invention, there is provided an information recording and reproducing apparatus that is capable of moving a probe head with high positional precision and mounting a positioning mechanism meeting a small dead space while promoting higher recording/readout speed.

The present invention includes a recording and reproducing apparatus constructed as described below.

(1) A recording and reproducing apparatus, comprising:
a fixed rectangular frame member;
a rectangular recording medium which records information and servo information relating to position;
an elastic member which swingably connects each middle point of four edges of the recording medium and the frame member to each other;
an actuator provided in the vicinity of each corner portion of the recording medium on a diagonal line of the frame member; and
a probe array section disposed in opposite to the recording medium, a plurality of probe heads for carrying out recording/readout of the information being disposed in a matrix shape,
wherein the recording and reproducing apparatus sequentially drives the actuators and causes the recording medium to carry out a precession motion.

What is claimed is:

1. A support section which swingably supports a rectangular recording medium including record information and servo information, in at least two directions that first and second axis directions;
a probe array disposed in opposite to the recording medium, including a plurality of probe heads for recording/reading out the record information and a servo head acquiring the servo information, the probe heads and the servo head are disposed in a matrix manner;
a position detecting section which detects a change in an absolute position of the recording medium;
an actuator which reciprocatingly moves the recording medium in one of the axis directions while reading out the servo information by means of the servo head; and
a control section which subjects the recording medium to the reciprocating movement by means of the actuator while in an operable state accessible to the recording medium, and recognizes a current position from the change in an absolute position and the servo information;
wherein the support section has:
a fixed base;
a frame member;
first support members which are provided respectively at an edge pair of a rectangular frame member opposite to each other in the first axis direction, and swingably support the frame member to the fixed base; and
second support members which are provided respectively at an edge pair of the recording medium opposite to each other in the second axis direction, and swingably support the recording medium to the frame member; and
the first support member is formed in a U shape, and the second support member is formed in an S shape.

2. A recording and reproducing apparatus, comprising:
a support section which swingably supports a rectangular recording medium including record information and servo information, in at least two directions that first and second axis directions;
a probe array disposed in opposite to the recording medium, including a plurality of probe heads for recording/reading out the record information and a servo head acquiring the servo information, the probe heads and the servo head are disposed in a matrix manner;
a position detecting section which detects a change in an absolute position of the recording medium;
an actuator which reciprocatingly moves the recording medium in one of the axis directions while reading out the servo information by means of the servo head;
a control section which subjects the recording medium to the reciprocating movement by means of the actuator while in an operable state accessible to the recording medium, and recognizes a current position from the change in an absolute position and the servo information;
an electrode electrically connected removably from an external device, and transmitting and receiving power supply, a control signal and an information signal.

3. A recording and reproducing apparatus, comprising:
a support section being formed in a rectangular frame, which supports a recording medium being formed in a rectangular shape and including record information and servo information, the support section is swingably connected to a middle points of four edges of the rectangular shape, by means of an elastic member;
a probe array disposed in opposite to the recording medium, including a plurality of probe heads for recording/reading out the record information and a servo head acquiring the servo information, the probe heads and the servo head are disposed in a matrix manner;
a position detecting section which detects a change in an absolute position of the recording medium;
a plurality of actuators is provided in the vicinity of corners of the recording medium; and,
a control section which continuously and sequentially drives the actuators and causes the recording medium to carry out a precession motion, during an operable state in which the recording medium is accessible for recording/reading out, and generates positional information between the recording medium and the probe array, from the change in the absolute position and the servo information.

4. The apparatus according to claim 1, wherein the servo information is disposed at a peripheral section of the recording medium.

5. The apparatus according to claim 1, wherein the positional information based on the change in the absolute position is used for coarse movement in the actuator, and
the positional information based on the servo information is used for fine movement in the actuator.

6. The apparatus according to claim 2, wherein the support section has:
a fixed frame member;
first support members which are provided respectively at an edge pair of the recording medium opposite to each other in the first axis direction, and swingably support the recording medium to the frame member; and second support members which are provided respectively at an edge pair of the recording medium opposite to each other in the second axis direction, and swingably support the recording medium to the frame member.

7. The apparatus according to claim 2, wherein the servo information is disposed at a peripheral section of the recording medium.

8. The apparatus of claim 2, wherein the positional information based on the change in absolute position is used for coarse movement in the actuator, and the positional information based on the servo information is used for fine movement in the actuator.

9. The apparatus according to claim 2, wherein the support section has:

a fixed base;

a frame member;

first support members which are provided respectively at an edge pair of a rectangular frame member opposite to each other in the first axis direction, and swingably support the frame member to the fixed base; and second support members which are provided respectively at an edge pair of the recording medium opposite to each other in the second axis direction, and swingably support the recording medium to the frame member.

* * * * *